June 3, 1958 L. I. MULVANEY ET AL 2,837,001
APPARATUS FOR TURNING TIRES ON LOCOMOTIVE WHEELS
Filed Aug. 9, 1954 2 Sheets-Sheet 1
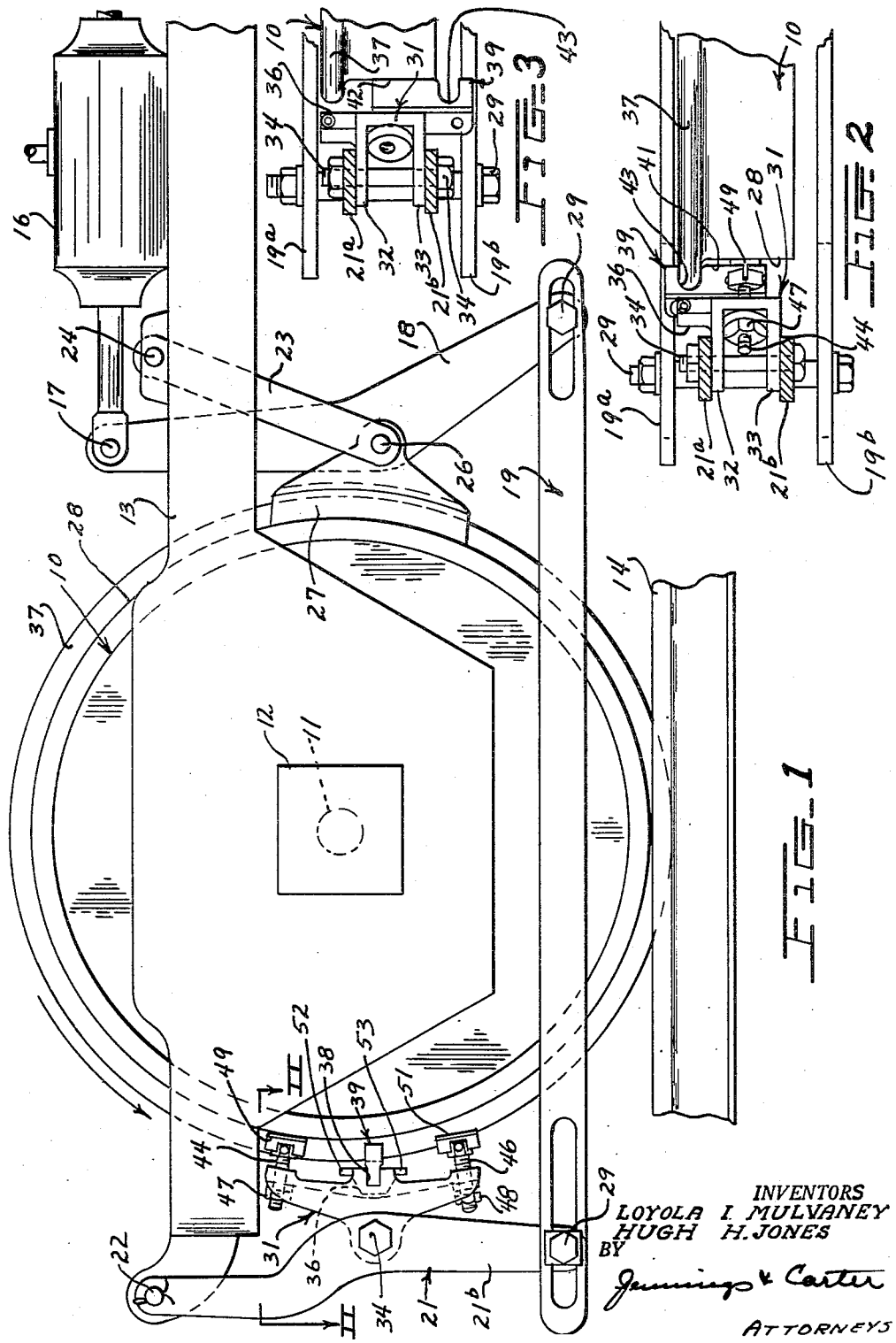
INVENTORS
LOYOLA I. MULVANEY
HUGH H. JONES
BY
ATTORNEYS June 3, 1958 L. I. MULVANEY ET AL 2,837,001
APPARATUS FOR TURNING TIRES ON LOCOMOTIVE WHEELS
Filed Aug. 9, 1954 2 Sheets-Sheet 2
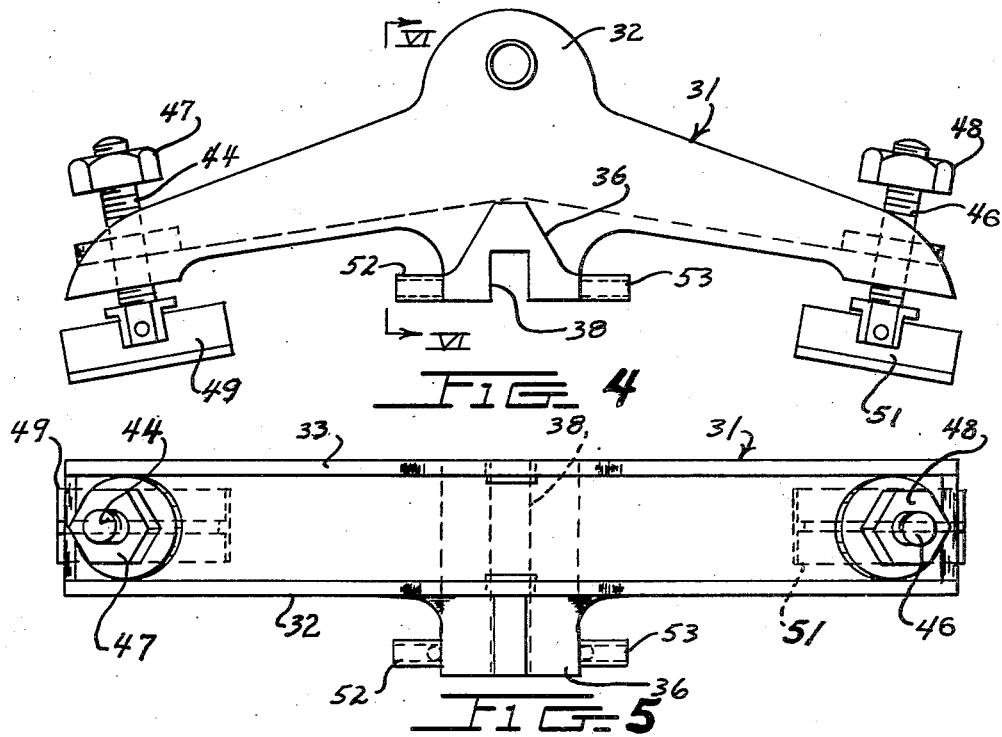
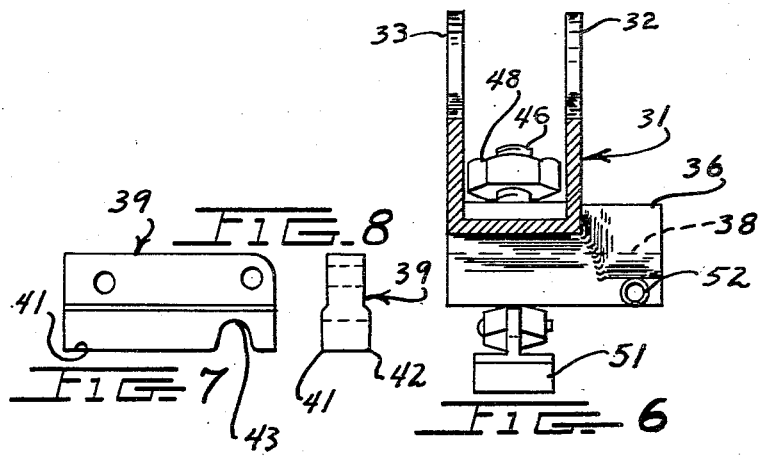
INVENTORS
LOYOLA I. MULVANEY
HUGH H. JONES
BY Jennings & Carter
ATTORNEYS

United States Patent Office 2,837,001
Patented June 3, 1958

2,837,001

APPARATUS FOR TURNING TIRES ON LOCOMOTIVE WHEELS

Loyola I. Mulvaney and Hugh H. Jones, Birmingham, Ala.

Application August 9, 1954, Serial No. 448,708

1 Claim. (Cl. 82—36)

This invention relates to an apparatus for machining the tires or the wheels of railway locomotives.

As is well known, the driving wheels of some locomotives especially diesel locomotives are cast solid, whereas others are provided with removable tires which are shrunk onto the wheels. Our invention is applicable to either type and wherever in this specification or in the claim the expressions "tire" or "wheel" are employed it is to be understood that they refer to the wheel with its tire portion whether the latter is separately formed or not.

A more specific object of our invention is to provide apparatus for machining the tires and wheels of locomotives in situ wherein a tool holder with a suitable forming tool is substituted for a brake shoe on the locomotive wheel to be turned and the locomotive air brake is employed to provide the necessary cutting pressure against the tool as the locomotive is moved along the rails.

A still further object of our invention is to provide apparatus for machining the wheels and tires of railway locomotives wherein the cutting tool is held in place by the locomotive air brake as the locomotive is moved along the rails and in which means are provided for limiting the depth of cut made by the cutting tool.

As is well known in the art to which our invention relates the tires of railway locomotive wheels and the wheels, where solid chilled wheels are employed, especially the flanges thereof, are subject to considerable wear and damage in service and when certain limits of wear or damage are reached must be taken out of service and the wheels turned. Flat spots, broken and chipped flanges, defective treads, and flanges with excessive flat vertical surfaces, are all defects which, under the strict inspection rules by which locomotives are operated, may render a locomotive unfit for service. Heretofore in this art it has been necessary in such event to take the locomotive into a shop, remove the defective wheels and place them in a large wheel lathe and turn them. After turning, the wheels were replaced. All this required a great deal of time and skilled labor and caused the locomotives to be out of service for a considerable period of time while repairs were being made.

All of the foregoing difficulties are overcome by means of our invention and the wheels or tires are machined in a minimum of time while on the locomotive and without taking the locomotive out of service. In accordance with our invention we provide a tool holder with a suitable forming tool which is designed for attachment to the locomotive brake rigging in place of a brake shoe on the wheel to be turned. The locomotive air brake is applied with a limited pressure to hold the forming tool against the wheel and the locomotive is moved along the rails. With the tool in place we have found that flanges may be reshaped in from 10 to 15 minutes. Where the tread also requires machining a somewhat longer period of time is required.

Apparatus embodying features of our invention is illustrated in the accompanying drawings forming a part of this application in which:

Fig. 1 is a side elevational view showing our improved apparatus applied to a locomotive wheel;

Fig. 2 is a detail sectional view taken along the line II—II of Fig. 1;

Fig. 3 is a view similar to Fig. 2 showing the forming tool in a different position and with certain parts removed;

Fig. 4 is a side elevational view of our improved tool holder;

Fig. 5 is a plan view thereof;

Fig. 6 is a sectional view taken along the line VI—VI of Fig. 4;

Fig. 7 is a side view of the forming tool we employ; and,

Fig. 8 is an end view thereof.

Referring now to the drawings for a better understanding of our invention, we show in Fig. 1 at 10 a locomotive wheel having an axle 11 mounted in a suitable bearing 12 in a frame 13. As illustrated, the locomotive wheel 10 is shown as rolling along a rail 14 in the direction indicated by the arrow. The locomotive is equipped with the usual air brake system including a brake cylinder 16 having its piston connected at 17 to a brake lever 18. The lower end of the lever 18 is connected through an equalizing bar 19 to a second brake lever 21 which is pivotally mounted at its upper end, at 22, to the locomotive frame. At 23, is shown a brake hanger which is pivotally connected at 24 to the locomotive frame and at its lower end is pivotally connected at 26 to the brake lever 18 and to a brake shoe 27 which bears against the perimeter 28 of the locomotive wheel 10.

In the example shown, the brake lever 21 also serves as a hanger and, as shown in Figs. 2 and 3, is comprised of two parallel bars or portions 21a and 21b. Also, the equalizing bar 19 is composed of two bars 19a and 19b to which the lever portions 21a and 21b are connected, at their lower ends, by means of a bolt 29.

Our improved tool holder, shown at 31, is generally curved in shape, conforming to the curvature of the wheel 10 and is of a length comparable to that of the brake shoe 27. On the rear of the tool holder are two mounting lugs 32 and 33 having transverse holes therein and a bolt 34 which passes through the lugs 32 and 33 and through corresponding holes in the lever portions 21a and 21b, whereby to mount the holder pivotally on the brake lever 21. The tool holder 31 is provided with a laterally extending portion 36 which overhangs the flange 37 of the wheel. Provided in the front face of the tool holder 31 and extending transversely across the tool holder and the extended portion 36 is a slot 38 which is rectangular in cross section. Mounted in the slot 38 is a forming tool 39 which has cutting edges 41 and 42 on opposite sides (Fig. 8), and is provided with a transverse slot 43 which fits over and is adapted to engage the flange 37 of the wheel. The forming tool 39 is well known in the art and is not claimed per se as a part of our invention. It fits slidingly in the slot 38 whereby to accommodate itself to relative lateral movement of the wheel 10 as it rolls along the rail. On opposite sides of the tool 39, near the ends of the tool holder 31, are two large screws 44 and 46 which extend through the tool holder and are provided on their outer ends with lock nuts 47 and 48. Pivotally mounted on the inner ends of the screws 44 and 46, facing the wheel 10, are limit shoes 49 and 51 which are adapted to bear, alternately, depending upon the direction of travel of the wheel 10, on the tread 28 of the wheel. The shoes 49 and 51 thus limit the cut being made by the tool 39 and also determine the angle of application of the tool to its work. At 52 and 53 are shown connections for circulating a suitable cutting oil or cooling liquid around the tool 39 as the work is being performed.

From the foregoing description, the operation of our improved apparatus and the method of its use will be readily understood. Whenever a tire or wheel requires machining either for defects in the flange, or the tread, as hereinbefore enumerated, we first remove one of the brake shoes serving that particular wheel together with its supporting head (not shown) and mount in its place our improved tool holder 31 with the forming tool 39 mounted slidably in the transverse slot 38. The locomotive brake is then set with a limited pressure which we have found to be from 10 to 20 pounds admitted to the brake cylinder 16 in a manner well understood. With this limited pressure in the brake cylinder, the locomotive may be driven by its own power along the rails 14. With the wheel 10 traveling in the direction indicated by the arrow, the limit shoe 49 engages the tread 28 of the wheel and causes the tool 39 to engage the flange 37 of the tire and machine it down to the required form. Should the locomotive be moved in the opposite direction, the limit shoe 49 leaves the tread 28 and the shoe 51 engages the tread. By adjustment of the screws 44 and 46, the angle of approach of the tool 39 and consequently the depth of the cut made by the tool may be adjusted.

In the Figs. 1 and 2 of the drawing, the tool 39 is shown with the groove 43 over the flange 37 so as to machine the flange to the required limits. In event the tread 28 is hollowed out, or has flat spots so that it requires turning, the tool 39, after the flange 37 has been machined, is reversed in its position in the slot 38, as shown in Fig. 3 of the drawing, with the slot 43 overhanging the outer edge of the tire 28, so that the tool bears against the tread 28. In this way we are enabled to machine the tread of the tire.

It will be understood by those skilled in the art that the particular arrangement of the locomotive wheel 10 with its air brake and brake rigging shown is for the purpose of illustration only and that the several different types of locomotives are provided with brake rigging and air brakes which are designed and adapted for each particular type. It will also be understood that our improved process and apparatus is applicable to all types of locomotives equipped with air brakes and brake rigging with which our improved tool holder 39 may be connected and used.

From the foregoing it will be apparent that we have devised an improved process and apparatus for machining the tires or the wheels of locomotives in situ which is simple of design, economical of manufacture, and which is reliable in operation, and that by means of our improved apparatus the tires or the wheel of locomotives may be machined to conform to strict inspection standards in a minimum of time and with a minimum of the expenditure of labor.

While we have shown our invention in but one form, it will be obvious to those skilled in the art that it is not so limited, but is susceptible of various changes and modifications without departing from the spirit thereof, and we desire, therefore, that only such limitations shall be placed thereupon as are specifically set forth in the appended claim.

What we claim is:

In a tool holder for machining flanged locomotive wheels, said tool holder having a transverse slot therein midway between its ends in position to face a wheel to be machined, a double edged forming tool loosely mounted in the transverse slot and having a curved slot in one end thereof adapted to fit over the flange of a wheel in cutting relation thereto both when the wheel is moving in one direction and when moving in the opposite direction, pivotal mounting means for the tool holder on its side opposite the forming tool, an adjusting screw extending through each end of the tool holder from rear to front, and a flat surfaced limit shoe pivotally mounted on each adjusting screw in position for one shoe only to engage a wheel being machine alternately as the wheel is moved first in one direction and then the other, thereby to determine the angle at which the edge of the tool is presented to the wheel and the depth of cut to be made.

References Cited in the file of this patent

UNITED STATES PATENTS

| | | |
|---|---|---|
| 470,010 | Rhodes | Mar. 1, 1892 |
| 640,751 | Corwin | Jan. 9, 1900 |
| 1,637,330 | A'Hearn et al. | Aug. 2, 1927 |
| 1,668,512 | Miller | May 1, 1928 |
| 2,152,380 | Hall | Mar. 28, 1939 |
| 2,213,002 | Hall | Aug. 27, 1940 |
| 2,703,031 | Glooskin | Mar. 1, 1955 |

FOREIGN PATENTS

| | | |
|---|---|---|
| 355,386 | Italy | Jan. 3, 1938 |